United States Patent
Mitchell

(10) Patent No.: US 9,933,258 B2
(45) Date of Patent: Apr. 3, 2018

(54) SHOE MOUNTED GRADIOMETER TOOL AND METHOD OF ADJUSTMENT

(71) Applicant: PAUL MITCHELL INVESTMENTS LTD., Collingwood (CA)

(72) Inventor: Paul Mitchell, Collingwood (CA)

(73) Assignee: Paul Mitchell Investments Ltd., Collingwood, Ontario (CA)

( * ) Notice: Subject to any disclaimer, the term of this patent is extended or adjusted under 35 U.S.C. 154(b) by 177 days.

(21) Appl. No.: 14/876,174

(22) Filed: Oct. 6, 2015

(65) Prior Publication Data

US 2016/0097639 A1 Apr. 7, 2016

Related U.S. Application Data

(60) Provisional application No. 62/060,538, filed on Oct. 6, 2014.

(30) Foreign Application Priority Data

Feb. 27, 2015 (CA) ..................................... 2883252

(51) Int. Cl.
- *G01C 9/10* (2006.01)
- *G01C 25/00* (2006.01)
- *A63C 19/00* (2006.01)
- *A43B 5/00* (2006.01)
- *A43C 19/00* (2006.01)

(52) U.S. Cl.
CPC ............... *G01C 9/10* (2013.01); *A43B 5/001* (2013.01); *A43C 19/00* (2013.01); *G01C 25/00* (2013.01); *G01C 2009/107* (2013.01)

(58) Field of Classification Search
CPC .......... A43B 5/001; A43C 19/00; G01C 9/10; G01C 2009/107; G01C 25/00
USPC ........................... 33/333, 334, 347, 370, 371
See application file for complete search history.

(56) References Cited

U.S. PATENT DOCUMENTS

| 450,457 | A | * | 4/1891 | Green | ..................... G01C 9/28 |
|---|---|---|---|---|---|
| | | | | | 33/334 |
| 1,286,418 | A | * | 12/1918 | Rohman | ................. H02P 9/007 |
| | | | | | 322/43 |

(Continued)

FOREIGN PATENT DOCUMENTS

| CA | 2883252 A1 * | 4/2016 | ............. A43B 19/00 |
|---|---|---|---|
| FR | 2528572 A1 * | 12/1983 | ............. G01C 9/005 |

(Continued)

*Primary Examiner* — R. A. Smith
(74) *Attorney, Agent, or Firm* — Pepper Hamilton LLP

(57) ABSTRACT

There is disclosed a shoe mounted gradiometer tool. The tool includes an enclosed housing having a convex interior base and a transparent top. A ball is disposed within the enclosed housing. The ball is sized and shaped to roll on the convex interior base. There is a mounting piece connected to the enclosed housing for securing the enclosed housing to an exterior surface of a shoe. The position of the shoe mounted gradiometer tool may be adjusted by placing a fastener through a fastener-receiving hole on the mounting piece. The fastener is loosely connected to a shoe. The orientation of the housing is adjusted by pivoting the housing around the fastener-receiving hole so that a marked level position of the tool corresponds to the lowest position of the convex interior base. The mounting piece is then mounted fixedly to the shoe.

18 Claims, 8 Drawing Sheets

(56) References Cited

U.S. PATENT DOCUMENTS

| | | | | |
|---|---|---|---|---|
| 1,498,066 A | * | 6/1924 | Barth | G01C 9/10 294/181 |
| 2,168,885 A | * | 8/1939 | Rickenbach et al. | G01C 9/10 33/365 |
| 2,384,453 A | * | 9/1945 | Chaney et al. | G01C 9/10 33/365 |
| 2,879,777 A | * | 3/1959 | Miller | A45D 24/36 132/148 |
| 2,923,552 A | * | 2/1960 | Sundberg | A63B 69/3685 33/347 |
| 3,146,529 A | * | 9/1964 | Chamberlin | G01C 9/34 248/316.1 |
| 3,751,819 A | | 8/1973 | Dixon | |
| 3,812,593 A | | 5/1974 | Wydro | |
| 4,794,701 A | * | 1/1989 | Clark | B23D 59/002 33/334 |
| 4,934,706 A | * | 6/1990 | Marshall | A63B 69/3632 33/334 |
| 5,058,283 A | * | 10/1991 | Wise et al. | B60N 2/28 33/333 |
| 5,063,679 A | * | 11/1991 | Schwandt | G01C 9/28 33/347 |
| 5,157,842 A | | 10/1992 | Swanda | |
| 5,209,470 A | | 5/1993 | Cimaroli et al. | |
| 5,625,956 A | * | 5/1997 | Cone, II et al. | G01C 9/10 33/333 |
| 5,755,623 A | | 5/1998 | Mizenko | |
| 5,820,476 A | | 10/1998 | Amato | |
| 6,386,994 B1 | | 5/2002 | H'Doubler et al. | |
| 6,408,545 B1 | | 6/2002 | Song | |
| 6,665,962 B2 | | 12/2003 | Shepherd | |
| 7,610,688 B2 | | 11/2009 | Yun | |
| 7,775,899 B1 | * | 8/2010 | Cannon | A63B 69/3632 33/334 |
| D632,351 S | | 2/2011 | Scott et al. | |
| 8,819,947 B2 | | 9/2014 | Yun | |
| 2014/0075769 A1 | * | 3/2014 | Swisher et al. | B44D 2/007 33/301 |

FOREIGN PATENT DOCUMENTS

| | | | | |
|---|---|---|---|---|
| JP | | 2001070003 A | * 3/2001 | A43B 5/00 |
| WO | WO 2011031010 A2 | * 3/2011 | | A43B 3/00 |

* cited by examiner

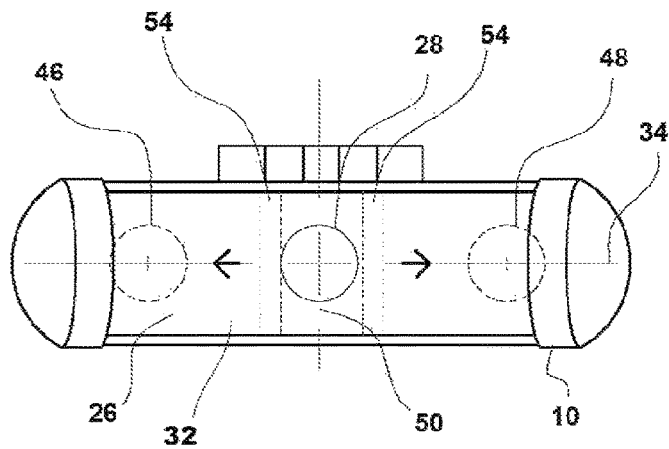
FIG. 4
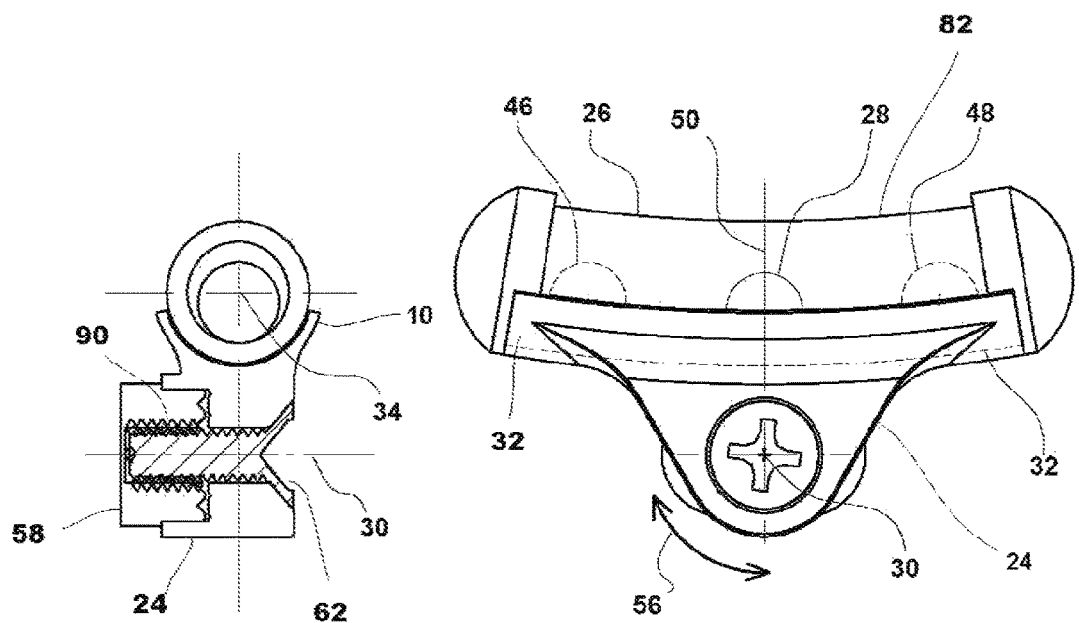
FIG. 5
FIG. 3

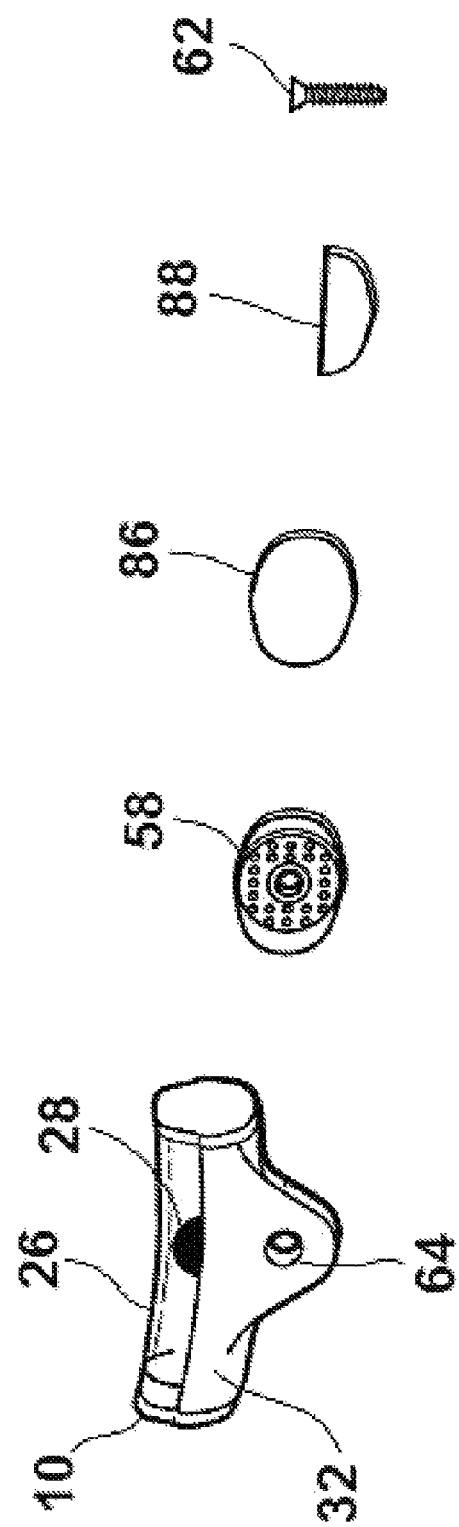

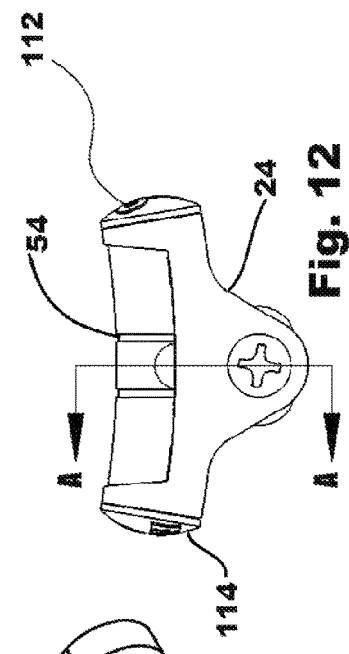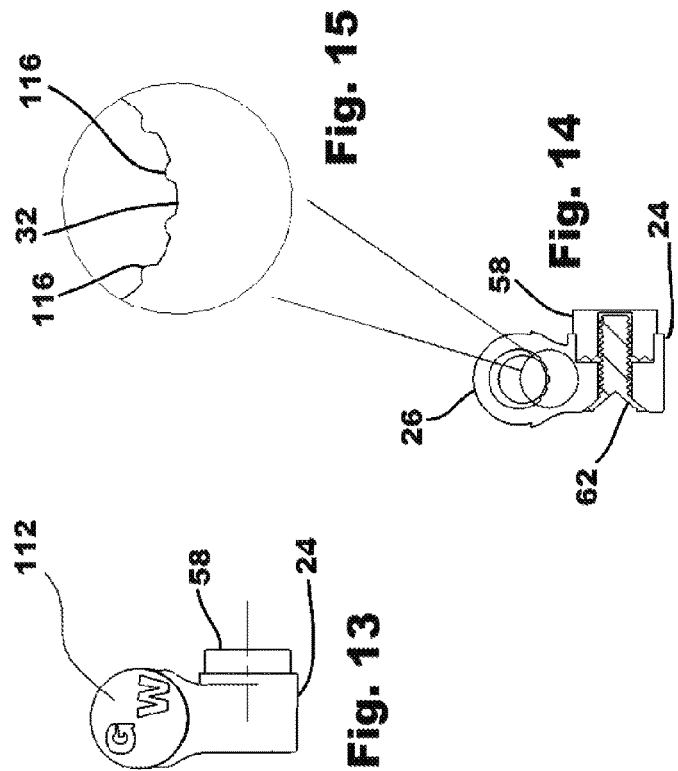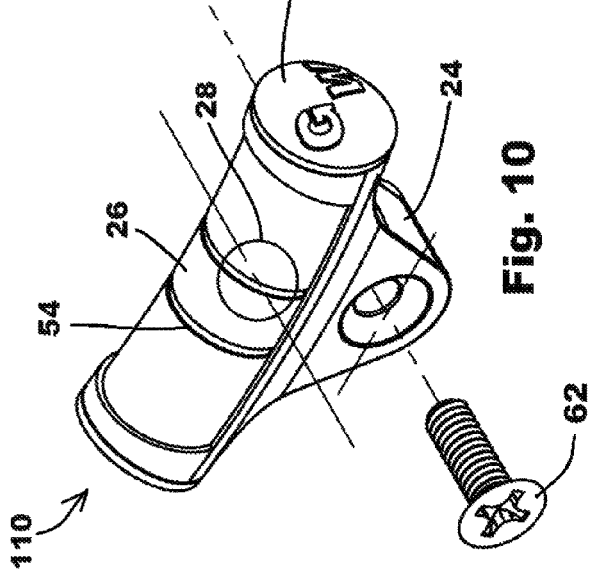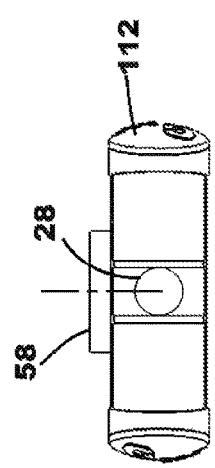

SHOE MOUNTED GRADIOMETER TOOL AND METHOD OF ADJUSTMENT

CROSS REFERENCE TO RELATED APPLICATIONS

This application claims priority to U.S. Provisional Patent Application No. 62/060,538, filed Oct. 6, 2014, and Canadian Patent Application No. 2,883,252, filed Feb. 27, 2015, each of which is hereby incorporated by reference in its entirety herein.

FIELD OF THE INVENTION

This patent document relates generally to the broad field of gradient sensitive tools to assist in the assessment of gradient conditions on a surface. In particular, this patent document relates to the field of assessing gradient conditions on walking surfaces such as golf greens.

BACKGROUND OF THE INVENTION

The game of golf is played worldwide by a vast variety of players ranging from beginners, to novices, to world class professionals. Unlike other sports, golf requires more finesse as opposed to strength and speed. This is especially so in that part of the short game involved with the green. Typically, greens are composed of contours on a putting surface which can include fingers, knobs, rolls, decks and ridges. Their placement, width, length, height and slopes will influence the challenge and playability of putting on the green and the difficulty of maintaining the surface. For many players the most difficult part of the game to master is putting where touch and feel are the most important. Much practice plus detailed knowledge of the green are critical to success. As a result, the putting green presents a challenging playing surface wherein it is difficult for some, and impossible for others, to accurately and regularly determine the path of the ball. Part of the challenge comes from the fact that the green contours are designed to be difficult to read as they include many changes and often feature very small angles of deviation from level. Many efforts, largely unsuccessful, have been attempted to assist the golfer in mastering the art of putting and reducing "read" errors.

U.S. Pat. No. 7,610,688 ("688 Patent") issued Nov. 3, 2009 to inventor Ji Hae Yun of Korea proposes that X and Y axis spirit levels be secured to the outsole of an atypical golf shoe. The description provides for a laterally extended sole which is then viewed by the golfer using what is described as a spirit level in an effort to determine slope of the golfing surface. The 688 Patent teaches the application of a spirit level at different frontal locations on the shoe and suggests both a rigid or a flexible spirit level.

Spirit levels, such as are disclosed in the 688 Patent, are designed to operate with a rigid tube so as to provide a reliable indication of a level condition along the length of the level. Spirit levels do not provide the actual slope. The 688 Patent is not known to this inventor to present an operable golfing device. Other references discussed in the 688 Patent include a spirit level secured to the top surface of the toe or to the inside edge of the heel of a golf shoe. These are described as ineffective.

U.S. Pat. No. 8,819,947 shows the use of a single spirit level mounted in a removable shoe cap located at the toe and on the outside surface of the shoe. In both cases this is a clip on to the body of the shoe as a whole or molded directly as part of the shoe. In these cases an elongated spirit level is shown as secured along its length to the golf shoe in those locations which are most likely to suffer from multi-axial bending and irregular wear, such as the forward or front part of the shoe. Where a lateral side of the shoe is shown the spirit level is secured along its length to a portion of the shoe where bending, torsion and wear are at their highest. This would quickly render such a spirit level or the actual shoe inoperative or worse.

Levels are remarkably difficult to read both accurately and quickly especially if the user is not using the level on a regular basis. When using a level, the bubble moves in the opposite direction of what someone inexperienced in its use may think it should travel. For example, one standing on a downward slope may assume the bubble should be at the lower end of the level, whereas the bubble is actually present in the opposite end of the level vial. This is made much more difficult when the spirit level is being read not from the side with the measured slope in the background but rather from the top down with no reference plane. The golf course itself, especially at and near the hole, is specifically designed and constructed to present a putting surface which appears to be planar and smoothly finished but which, in fact, is carefully organized to include a variety of very small deviations and changes in contour for the purpose of making the surface difficult to "read".

Attachment of a spirit level to a golf shoe in locations such as the top or front of the toe piece are highly prone to deviation in use over the wide variety of heat, humidity and wetness conditions experienced in periods as short as a single round of golf and with wear over time. These locations offer or tend to offer an orientation which is indeterminate over short and long term ranges of time and thus are unreliable for diminishingly small angles. Further, merely securing a spirit level to a shoe is prone to failure since the shoe itself is flexible and in constant motion, all the while bending and flexing in all 3 dimensions as the user walks, bends, shifts position, kneels and stands. Golf shoes are designed with a significant lifetime over which they will be subjected to long periods of disuse followed by intensely active use in widely varying conditions. Thus, the golf shoe suffers from significant wear which is highly dependent on the usage of the individual user. Spirit levels are also reliant on air bubbles, which are unreliable as they may break into multiple bubbles or may be difficult for a user to see. The bubble can potentially break up into several smaller bubbles with the force of the foot striking the ground when walking. This problem would make it difficult to properly read the bubble. An air bubble has no colour and therefore would be difficult to see from a distance or in varying light conditions.

Some devices intended to assist a golfer to "read the green" are carried by a golfer in his pocket or golf bag and when used they are then placed on the surface of the green. The device can be as simple as a bull's eye level or as complex as an "app" that is downloaded to a cell phone. To use the cell phone or the mechanical bull's eye level they are then placed on the green at a designated area. The problem with this method is three fold.

a. Generally the device is set down in a location somewhere along the line where the golfer expects to putt. This takes time and is cumbersome to handle.

b. Because the device is placed on the green in one location it provides only a limited amount of information about the topography between the golf hole and the golf ball.

c. If a golfer was to move the device around the green to gather more information on the topography of the green it can be distracting to other players involved in the same group and unduly delay the putting progress and time spent on the green.

Other attempts to use a gradiometer to measure a surface include the following references:

U.S. Pat. No. 3,751,819;
U.S. Pat. No. 3,812,593;
U.S. Pat. No. 5,157,842;
U.S. Pat. No. 5,209,470;
U.S. Pat. No. 5,755,623;
U.S. Pat. No. 5,820,476;
U.S. Pat. No. 6,386,994;
U.S. Pat. No. 6,408,545;
U.S. Pat. No. 6,665,962; and
U.S. Design Pat. 632,351.

Those references do not teach an effective improvement of the short game and putting in golf.

SUMMARY OF THE INVENTION

In one embodiment there is a shoe mounted gradiometer tool. The tool has an enclosed housing having a convex interior base and a transparent top. A ball is disposed within the enclosed housing. The ball is sized and shaped to roll on the convex interior base. A mounting piece is connected to the enclosed housing for securing the enclosed housing to an exterior surface of a shoe.

In another embodiment there is a method of adjusting the positioning of a shoe mounted gradiometer tool on a shoe. A shoe mounted gradiometer tool is provided. The tool has an enclosed housing having a convex interior base and a transparent top. The convex interior base has a marked level position and a lowest position. A ball is disposed within the enclosed housing. The ball is sized and shaped to roll on the convex interior base. The tool has a mounting piece having a fastener-receiving hole. The mounting piece is connected to the enclosed housing. A fastener is placed through the fastener-receiving hole of the mounting piece. The fastener is connected loosely to a shoe. The orientation of the enclosed housing is adjusted by pivoting the enclosed housing around the fastener-receiving hole of the mounting piece so that the marked level position corresponds to the lowest position. The mounting piece is fixedly secured to the shoe.

BRIEF DESCRIPTION OF THE DRAWINGS

Reference will now be made to preferred embodiments of this method and system, by way of example only, with reference to the following figures in which:

FIG. 3 is a detailed side elevation view of the gradient tool of the embodiment of FIG. 1;

FIG. 4 is a plan view of the gradient tool of the embodiment of FIG. 1;

FIG. 5 is a cross-section of the gradient tool of the embodiment of FIG. 1;

FIG. 7 is a side view of the components of the gradient tool of FIG. 1;

FIG. 10 is an exploded perspective view of a gradient tool;

FIG. 11 is a top view of the gradient tool of the embodiment of FIG. 10;

FIG. 12 is a side view of the gradient tool of the embodiment of FIG. 10;

FIG. 13 is an end view of the gradient tool of the embodiment of FIG. 10;

FIG. 14 is cross-section view of the gradient tool in FIG. 12 along the section A-A;

FIG. 15 is a detailed view of a portion of the gradient tool of FIG. 14;

DETAILED DESCRIPTION OF THE PREFERRED EMBODIMENTS

Figure 1:
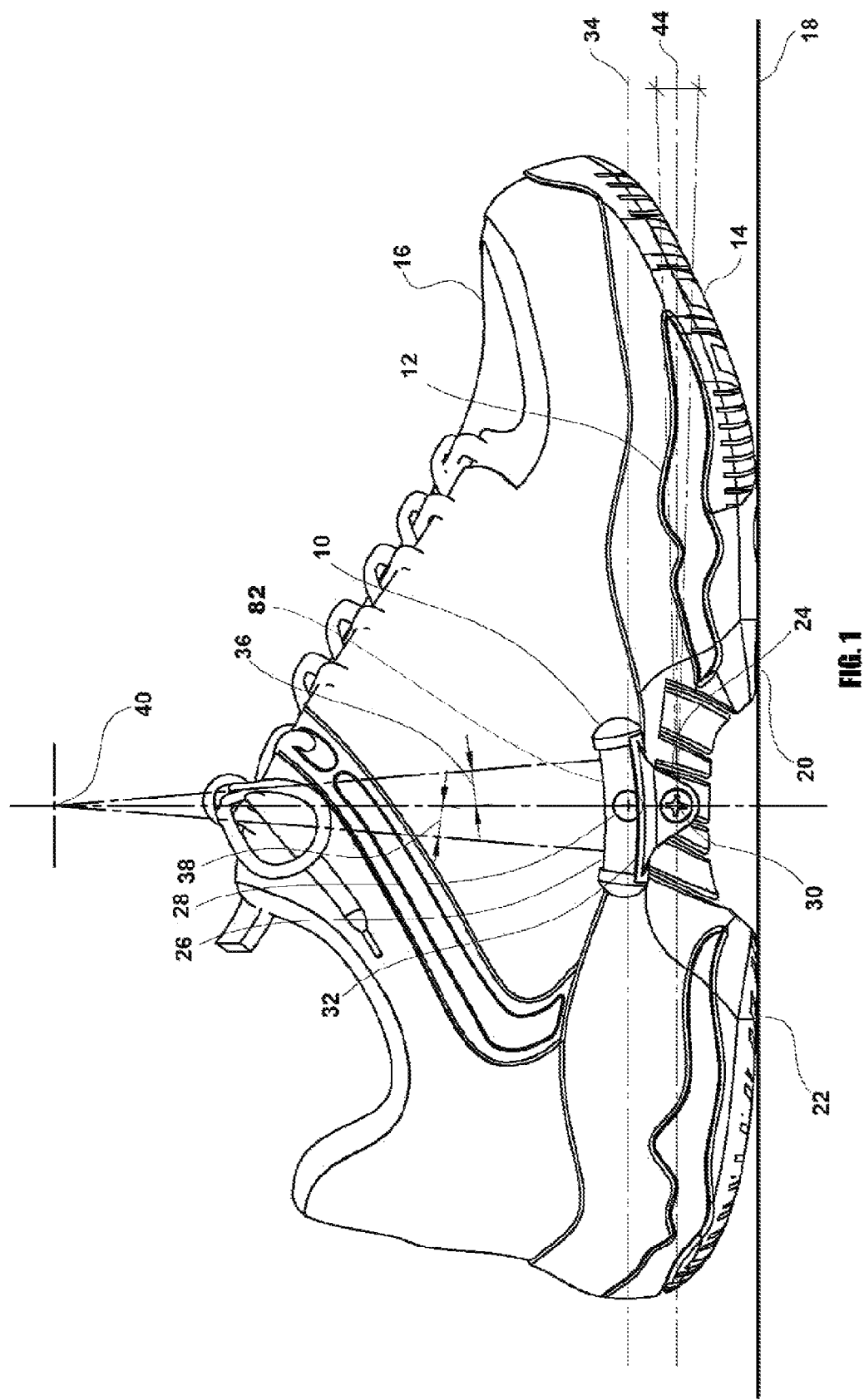
FIG. 1 is a side elevation of a typical modern golf shoe with a gradient tool secured longitudinally to the outside lateral edge of the sole.
Figure 2:
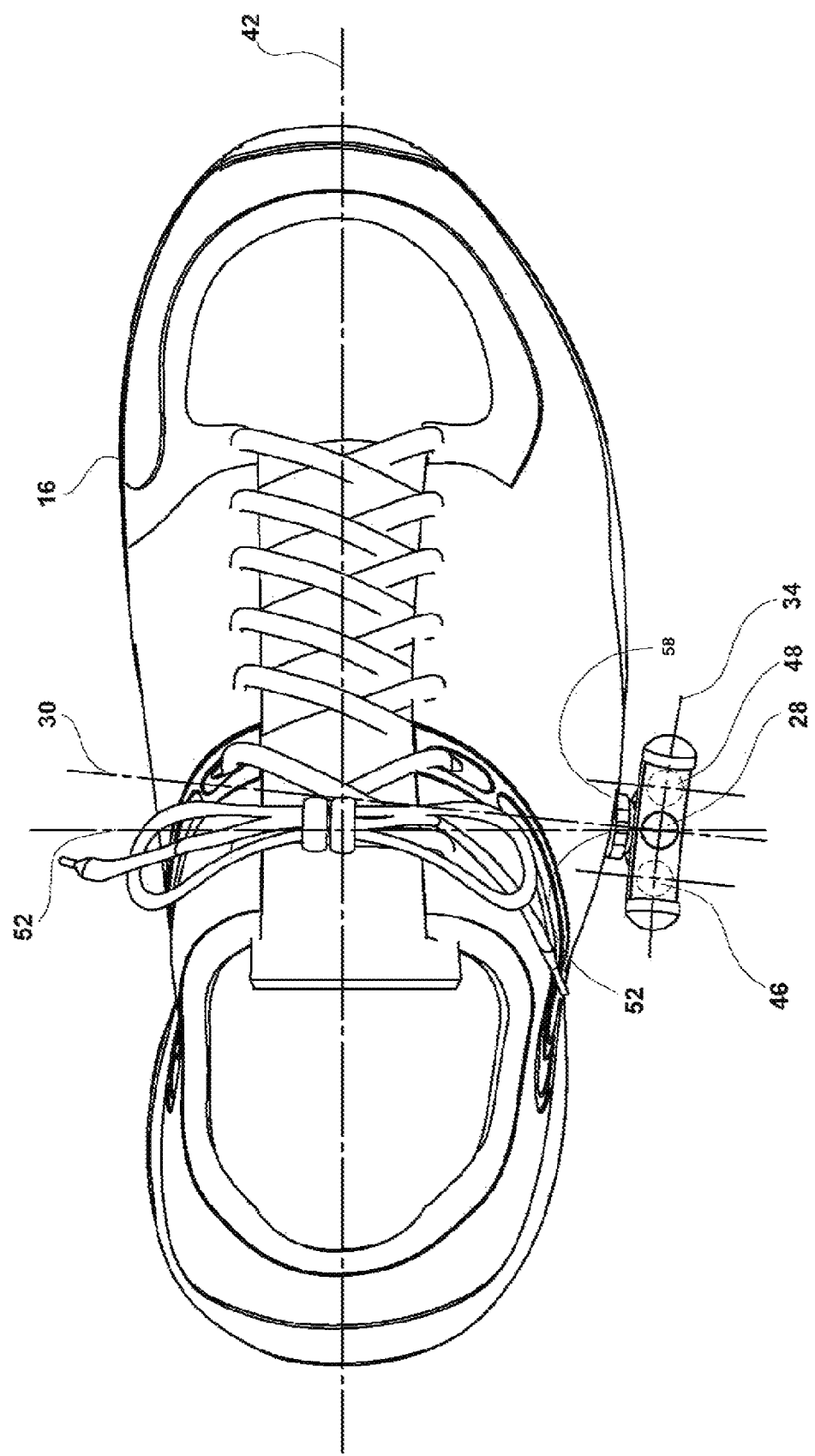
FIG. 2 is a top plan view of the embodiment of FIG. 1.

FIGS. 1 and 2 show a shoe mounted gradiometer tool 10 attached to an outside lateral edge 12 of a sole 14 of a modern golf shoe 16. The shoe mounted gradiometer tool 10 may also be connected to other types of shoes other than golf shoes where assessing gradient conditions of a surface is important. Sole 14 is shown in full contact with a level ground surface 18, with both a frontal portion 20 and the heel 22 of the shoe in contact with the ground.

The gradiometer 10 includes a mounting piece 24 which is releasably secured to a mounting plate anchor 58 on the sole 14 about an axis of rotation 30 (FIG. 6) which axis is preferably transverse to a long axis 42 of the shoe 16. The gradiometer 10 has an enclosed housing which includes a convex interior base 32 and a transparent top 26. As shown in FIG. 1, the transparent top 26 is preferably an upper portion of a convex curved tube 82 which is secured to the convex interior base 32. A rolling ball 28 is closely confined within the enclosed housing for free motion under the influence of gravity along the convex interior base 32. Preferably transparent top 26 and convex interior base 32 are aligned by rotation about transverse axis 30 preferably to bring axis 34 parallel to level surface 18. The ball 28 does not need to be perfectly spherical so long as it is capable of rolling unobstructed within the enclosed housing.

The curved tube 82 preferably may be empty or alternatively filled with a low viscosity fluid such as alcohol. In other embodiments, the transparent top 26 may be formed as a separate top piece which cooperates with the convex interior base 32 to form the enclosed housing without being formed from a single tubular piece. As shown in FIG. 1, the entire curved or round tube 82 is made from a transparent material such as clear plastic. The transparent top 26 does not need to be entirely clear so long as the movement of the ball 28 is visible through the top. Although not preferred, the transparent top may include openings so long as the ball is prevented from accidentally falling out of the enclosed housing.

Figure 6:
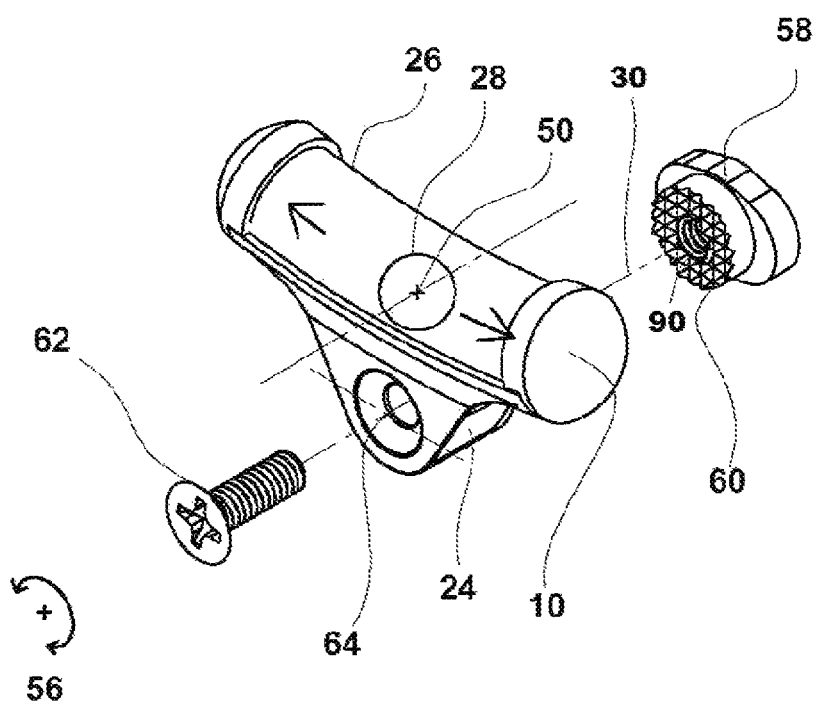
FIG. 6 is an exploded perspective view of the gradient tool the embodiment of FIG. 1.

As shown in FIG. 6, the mounting piece 24 extends below the convex interior base 32 and the mounting piece includes a fastener-receiving hole 64 (FIG. 6). The mounting piece 24 is, in use, connected to the mounting plate anchor 58, which may be connected directly to the sole 14 of the shoe 16, or may be connected to spacers 86 (FIG. 7) or wedges 88 (FIG. 7) and then connected to the shoe 16. The method of connection between the shoe 16 and the gradiometer 10 is described in more detail below. The mounting plate anchor 58 includes an uneven surface 60 which is connected to the mounting piece 24. The uneven surface 60 assists in reducing undesirable rotation between the mounting piece 24 and the mounting plate anchor 58.

Figure 16:
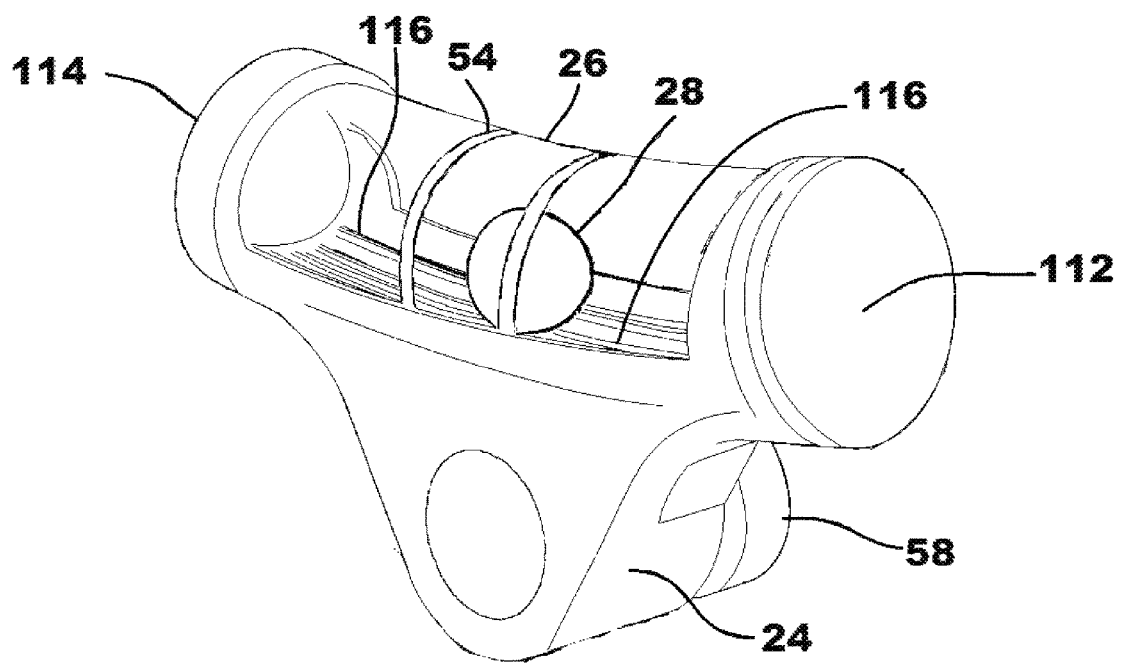
FIG. 16 is a perspective view of the gradient tool of FIG. 10.
Figure 17:
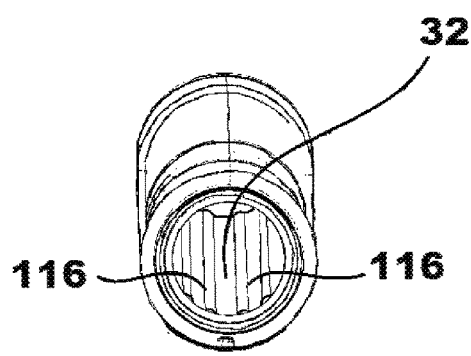
FIG. 17 is a front perspective view of a convex curved tube of the gradient tool of FIG. 10.

As shown in FIG. 4, the convex interior base 32 has an arcuate surface which includes markings 54 which indicate a marked level position. When the gradiometer 10 is resting on level ground, the ball 28 will lie in the lowest position on the convex interior base 32, which if the gradiometer is properly leveled should correspond to the marked level position. In the embodiment in FIG. 4, the ball 28 is in the marked level position when the ball sits directly between the markings 54 as is shown in the figure. The ball 28 is shown with dotted lines at 46 and 48 in positions that do not correspond to the marked level position. The markings 54 indicative of the marked level position may constitute markings on the convex interior base 32 directly or may be marked on the lower portion of the curved tube 82 so long as the markings are visible to the golfer when viewed from above. The marked level position may also be indicated on the upper surface of the tube 82 as shown in the embodiment of FIG. 16. Other methods of marking the marked level position may also be used, for example, by using a color gradation for different positions or with markings indicating the degree of slope, so long as the user is able to determine level and a series of non-level positions of the ball 28. Although the arcuate surface of the convex interior base 32 is shown with a uniform axis of curvature, the base 32 may have different angles and a non-uniform axis of curvature so long as the ball 28 is capable of moving in a relatively smooth manner across the surface, which provides information to the user of a range of putting surface angles, rather than simply whether the surface is down sloping, up sloping or even.

The fastener-receiving hole 64 of the mounting piece 24 defines the pivoting axis 30. Rotation of the enclosed housing about the pivoting axis changes the lowest position of the arcuate surface of the convex interior base 32. As shown in FIG. 3, the pivoting axis 30 and the marked level position of the arcuate surface defined by the markings 54 lies in the same vertical plane when the lowest position of the ball 28 corresponds to the marked level position of the arcuate surface. This means that pivoting of the gradiometer 10 about the fastener-receiving hole 64 will allow for the user to properly adjust the level position the gradiometer 10.

As shown in FIG. 6, a fastener 62, which is shown as a threaded bolt, but could also be a screw (FIG. 7) or other fastening device, is connected through the fastener receiving hole 64 and into the mounting plate anchor 58. The fastener 62 is shown secured inside the fastener receiving hole 64 of the mounting piece 24 and a fastener-receiving hole 90 of the mounting plate anchor 58 in FIG. 5. Although not shown in the figures, the mounting plate anchor 58 may be formed integrally with the shoe itself. In those embodiments, the shoe will be manufactured with a mounting plate anchor built into the shoe and the mounting piece of the shoe may be connected directly to the mounting plate anchor on the exterior of the shoe. For example, the shoe may include a bolt hole provided directly into the sole.

Once the gradiometer 10 of the preferred embodiment shown in FIGS. 1 and 2 is leveled so that axis 34 is parallel to level surface 18, ball 28 will rest directly above axis 30 and central to the length of tube 82 as shown in FIGS. 1 and 2. In use, placement of the shoe 16 on a non-level surfaces depicted by range of angles 44 (FIG. 1) will cause ball 28 to roll along axis 34. As in FIG. 2, ball 28 will stop at a central angular rest position as shown at 40, and off-center for a toe-down angle 36 and a heel-down toe-up angle 38 respectively. Different ranges of angles are possible with different levels of curvature and different lengths of arcuate surfaces.

Most preferably, curved tube 82 has a long radius of curvature 40 (FIG. 1) to permit the angular positions 36 and 38 respectively to represent small to very small angles of deviation 44.

As shown in FIG. 2, as gradiometer axis 34 is put out of level by use of the shoe 16, ball 28 rolls along the curved surface 32 from a rear position 46 indicating an heel-down up slope in axis 34 to a forward position 48 indicating a toe-down heel-up down slope in axis 34. The zero or level position 50 is preferably set by rotation of the gradiometer 10 about pivoting axis 30 to position ball 28 centrally and over axis 30, as shown in FIG. 2. Axis 30 may be aligned with the centre of the arch of the user's foot as at axis 52. Although placement at this location of the golf shoe is considered preferable, other locations on the shoe are also possible. For example, the gradiometer may be placed in other locations such as the toe of the shoe, although that is a less desirable placement location.

The position of the gradiometer 10 may be adjusted as follows. The fastener 62 is placed through the fastener-receiving hole 64 of the mounting piece 24. The fastener 62 is then loosely fastened to the shoe 16. The orientation of the enclosed housing is adjusted by pivoting the enclosed housing around the fastener-receiving hole 64 of the mounting piece 24 so that the marked level position corresponds to the lowest position of the ball 28. Once the appropriate leveling is completed, the fastener 62 is tightened so that the mounting piece 24 is secured fixedly to the shoe 16. Different types of fasteners may also be used as long as the orientation of the gradiometer 10 may be adjusted to allow for appropriate adjustment of the zero position of the tool. As shown in FIGS. 5 and 6, the fastener may be loosely connected to the mounting plate anchor 58 which is separately securely attached to the shoe 16.

Preferably, the gradiometer 10 is connected to the centre of the arch on the outside sole 14 of the shoe 16. Spacers 86 may be used to create an extension from the side sole of the shoe. Shoes with minimal sidewalls may also require the attachment of a wedge 88. In order to properly mount the mounting plate anchor 58, the mounting area on the edge of the shoe 16 should be cleaned of dirt, dust and oil. An adhesive should be applied to the back of the mounting plate anchor 58. If spacers 86 and/or wedges 88 are used, those should be adhered first prior to mounting the mounting plate anchor 58. The mounting plate anchor 58 is preferably positioned length-wise parallel with the shoe. The assembled mounting plate anchor 58 with or without spacers and wedges is mounted to the outside of the arch of the shoe 16. The adhesive used may be cyanoacrylate (Super Glue gel) or other semi-permanent or permanent adhesive agent. In the case of cyanoacrylate, the assembled mounting plate anchor 58 should be held on the outside of the shoe for approximately 30 seconds and then left to fully cure for at least an hour. In the case where a screw is used, the gradiometer may be installed by placing the shoe on a level surface. The screw is tightened lightly on mounting plate anchor 58. The center of the ball 28 should be adjusted so that it is in the zero position. The user may wish to stand up in the shoe and check that the ball remains in a centred position while the shoe is worn. The gradiometer 10 may be adjusted as necessary and then firmly tightened using the screw. Preferably, the set screw should be tightened by hand.

Once the level position shown in FIGS. 3-5 is set with ball 28 centrally located, as at position 50 between location markers 54 thereby correcting any deviation of the tube 82 about axis 30 through a small angle as at 56, at the point of use, the gradiometer 10 and shoe 16 combination is ready for use. Small errors in the "read" in interpretation of the main characteristic of the golf green are displayed and provide a gradient warning to the user, particularly in very small angle situations. Further preferably, the gradient tool 1 of the invention is secured to the shoe sole for rotation about axis 30 by an adjustable assembly including a mounting plate anchor 58 with an irregular contact surface 60. Surface 60 provides frictional and compression fixation of tool 10 against further rotation.

Figure 9:
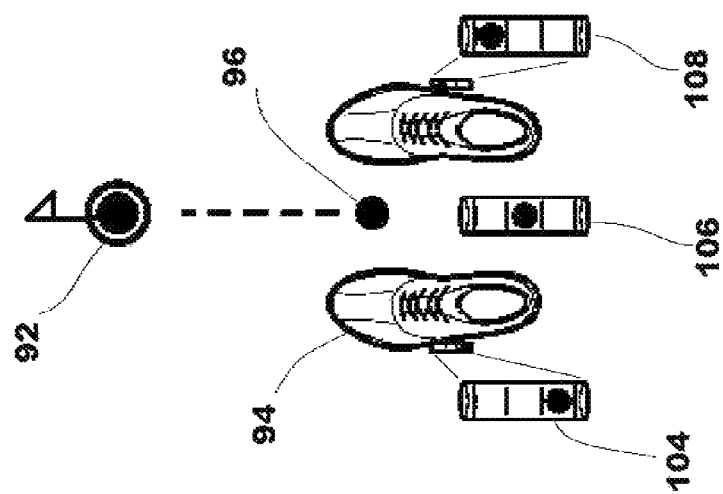
FIG. 9 is a representative schematic drawing showing the information displayed by the gradient tool in use.
Figure 8:
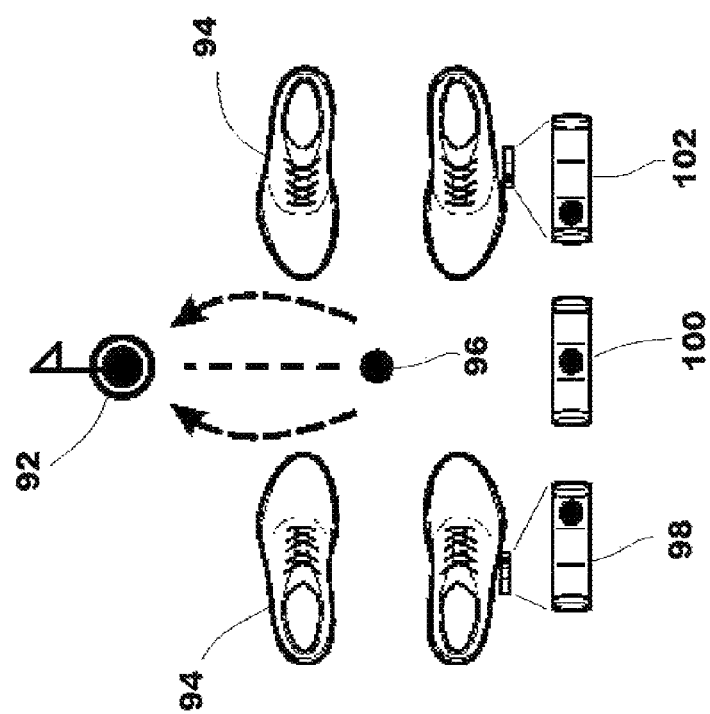
FIG. 8 is a representative schematic drawing showing the information displayed by the gradient tool in use.

FIGS. 8 and 9 show the information displayed by the gradiometer when used on a golf green. In FIG. 8, the golfer places his feet 94 facing perpendicular to the direction between the golf ball 96 and the hole 92. As shown in the orientation of FIG. 8, if the ball 28 moves to the right as shown at 98, then the green breaks from the left to right. If the ball 28 is centered as shown at 100, then the green is flat. If the ball moves to the left as shown at 102, then the green breaks from the right to the left. As shown in the orientation of FIG. 9, if the ball moves back as shown at 104, then the green is sloped upward towards the hole 92. If the ball stays in the center as shown at 106, then the green is flat. If the ball moves forward as shown at 108, then the green is sloped downward towards the hole 92. The information displayed by the gradiometer in terms of direction of slope is the same when used on any other surface such as a tee box, fairway or other surface which is desired to be measured.

FIGS. 10 to 17 show another embodiment of a shoe mounted gradiometer tool 110. As shown in FIG. 14, the integrated transparent top 26 and the mounting piece 24 of the gradiometer tool 110 are formed from a single piece. The gradiometer tool 110 of FIG. 10 otherwise shares many of the same features as the gradiometer tool 10 of FIG. 1, and so the same reference characters are used to describe the same features of the two embodiments. The gradiometer 110 may be mounted and used in the same manner as the gradiometer tool 10 embodied in FIG. 1.

As shown in FIG. 10, the markings 54 of the gradiometer tool 110 are placed on the top of the transparent top 26, rather than on the bottom of the convex interior base 32. The markings 54 allow the position of the rolling ball 28 to be visible by the user from above.

As shown in FIGS. 14-17, a guiding mechanism 116 is placed along the convex interior base 32. As shown in FIG. 14, the guiding mechanism is a plurality of rails that extend lengthwise along the convex interior base 32 and are evenly-spaced from one another. As shown in FIG. 14, the plurality of rails is a set of four rails that each extend along the length of the convex interior base 32. Different numbers of rails may be used and they need not be evenly-spaced, so long as the rails 116 allow the ball 28 to move along the convex interior base. The rails may be formed integrally with the convex interior base 32 during the moulding process. The guiding mechanism may also be formed from a plurality of grooves in the convex interior base 32. The guiding mechanism, such as rails, may assist in ensuring that the ball travels more evenly across the base and reduce undesirable wobble. The guiding mechanism does not need to extend continuously along the length of the base so long as they reduce undesirable wobble. Reducing wobble may increase the accuracy of the measurements provided by the gradiometer.

As shown in FIGS. 11 and 12, end caps 112 and 114 are placed on either end of the gradiometer tool 110. The end caps may each be single molded pieces made from a suitable material, such as polycarbonate. After the ball 28 is placed into the interior of the gradiometer tool, the ends caps may be secured into place, for example, by gluing.

The gradiometer tools 10 and 110 may be manufactured from polycarbonate. Although in the preferred embodiment the elements of the gradiometers 10 and 110, including the enclosed housing and the mounting piece 24 are made of plastic, other suitable materials may also be used. As another example, polyvinyl chloride may also be used.

The mounting plate anchor 58, spacer 86 and wedge 88 may also be constructed, for example, from polycarbonate, although other plastic materials or other suitable materials may be used.

The ball 28 may be made from a number of different materials, including acetal, nitrile rubber or chrome steel. The choice of material used to form the ball may depend on the type of material chosen to form the gradiometer. For example, if polyvinyl chloride is used to form the gradiometer, it may not be advisable to choose acetal for the ball, since in extremely dry environments, acetal and polyvinyl chloride may produce static.

Although the invention is described in terms of particular implementations, it is to be understood that the invention is not limited in its application to the details of construction and to the arrangements of the components set forth in the description or illustrated in the drawings. The invention is capable of other embodiments and of being practiced and carried out in various ways without departing from the scope of the invention. Accordingly, the scope of the claims should not be limited to the preferred embodiments set forth in the examples, but should be given the broadest interpretation consistent with the description as a whole.

In the claims, the word "comprising" is used in its inclusive sense and does not exclude the possibility of other elements being present. The indefinite article "a/an" before a claim feature does not exclude more than one of the feature being present unless it is clear from the context that only a single element is intended.

I claim:

1. A shoe mounted gradiometer tool, comprising:
    an enclosed housing having a convex interior base, wherein the convex interior base forms an arcuate surface having a marked level position and a lowest position, and a transparent top;
    a ball disposed within the enclosed housing, the ball sized and shaped to roll on the convex interior base; and
    a mounting piece, further comprising a fastener-receiving hole, connected to the enclosed housing for securing the enclosed housing to an exterior surface of a shoe;
    the fastener-receiving hole of the mounting piece defines a pivoting axis and in which rotation of the enclosed housing about the pivoting axis changes the lowest position of the arcuate surface.

2. The shoe mounted gradiometer tool of claim 1 in which the pivoting axis and the marked level position of the arcuate surface lie in the same vertical plane when the lowest position corresponds to the marked level position.

3. The shoe mounted gradiometer tool of claim 1 in which the enclosed housing further comprises a curved tube.

4. The shoe mounted gradiometer of claim 1 in which the enclosed housing further comprises a round tube fastened onto the convex interior base.

5. The shoe mounted gradiometer of claim 4 in which the round tube is transparent and the tube has an upper portion and a lower portion, in which the lower portion is fastened onto the convex interior base and the upper portion forms the transparent top.

6. The shoe mounted gradiometer tool of claim 1 further comprising a fastener to connect the enclosed housing to the shoe through the fastener-receiving hole.

7. The shoe mounted gradiometer tool of claim 6 in which the fastener is a screw or threaded bolt.

8. The shoe mounted gradiometer tool of claim 7 further comprising a mounting plate anchor having a fastener-receiving hole for connection between the mounting piece and the shoe.

9. The shoe mounted gradiometer tool of claim 1 in which the ball is made with Acetal.

10. The shoe mounted gradiometer tool of claim 1 in which the ball is made with nitrile rubber.

11. The shoe mounted gradiometer tool of claim 1 in which the enclosed housing is made of plastic and the transparent top is made of clear plastic.

12. The shoe mounted gradiometer tool of claim 1 in which the mounting piece is secured to an outside lateral edge of a sole of the shoe.

13. The shoe mounted gradiometer tool of claim 1 in which the mounting piece is secured to a golf shoe.

14. The shoe mounted gradiometer tool of claim 1 further comprising a guiding mechanism extending lengthwise along the convex interior base.

15. The shoe mounted gradiometer tool of claim 14 in which the guiding mechanism further comprises a plurality of rails.

16. A method of adjusting the positioning of a shoe mounted gradiometer tool on a shoe, comprising:
provide a shoe mounted gradiometer tool, the tool comprising:
an enclosed housing having a convex interior base and a transparent top, the convex interior base having a marked level position and a lowest position;
a ball disposed within the enclosed housing, the ball sized and shaped to roll on the convex interior base; and
a mounting piece having a fastener-receiving hole, the mounting piece connected to the enclosed housing;
placing a fastener through the fastener-receiving hole of the mounting piece and connecting the fastener loosely to a shoe;
adjusting the orientation of the enclosed housing by pivoting the enclosed housing around the fastener-receiving hole of the mounting piece so that the marked level position corresponds to the lowest position; and
securing the mounting piece fixedly to the shoe.

17. The method of adjusting the position of a shoe mounted gradiometer tool on a shoe in claim 16 in which the shoe mounted gradiometer tool further comprises a mounting plate anchor having a fastener-receiving hole for connection between the mounting piece and the shoe, and in which connecting the fastener loosely to the shoe further comprises connecting the fastener loosely to the mounting place anchor.

18. A shoe mounted gradiometer tool, comprising:
an enclosed housing having a convex interior base and a transparent top;
a ball disposed within the enclosed housing, the ball sized and shaped to roll on the convex interior base;
a mounting piece, further comprising a fastener-receiving hole, connected to the enclosed housing for securing the enclosed housing to an exterior surface of a shoe;
a fastener, selected from a screw or threaded bolt, to connect the enclosed housing to the shoe through the fastener-receiving hole; and
a mounting plate anchor having a fastener-receiving hole for connection between the mounting piece and the shoe.

* * * * *